US006481572B2

(12) United States Patent
Wien et al.

(10) Patent No.: US 6,481,572 B2
(45) Date of Patent: Nov. 19, 2002

(54) ALL IN ONE MULTI-LAYER LABEL AND INSERT ASSEMBLY

(75) Inventors: Tom Wien, Newport Beach, CA (US); Andre Saint, Tonawanda, NY (US); Donald E. Banks, Huntington Beach, CA (US); Kocheng Michael Wu, Rowland Heights, CA (US); Craig M. Surette, Yorba Linda, CA (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/801,284

(22) Filed: Mar. 6, 2001

(65) Prior Publication Data

US 2002/0125152 A1 Sep. 12, 2002

(51) Int. Cl.[7] .................................................. B32B 7/12
(52) U.S. Cl. ..................... 206/232; 206/308.1; 206/460; 428/41.8; 428/42.2; 428/43
(58) Field of Search ............................ 40/340; 206/232, 206/308.1, 459.5, 460; 283/81; 428/40.1, 41.8, 42.2, 43

(56) References Cited

U.S. PATENT DOCUMENTS

| | | | |
|---|---|---|---|
| 3,921,319 A | 11/1975 | Styers et al. ................... 40/10 |
| 4,365,708 A | 12/1982 | Tyus ........................... 206/309 |
| 4,411,360 A | 10/1983 | Gardineer, Jr. et al. ..... 206/313 |
| 4,736,840 A * | 4/1988 | Deiglmeier ............... 206/308.1 |
| 4,757,901 A * | 7/1988 | Woods ........................ 206/232 |
| 5,024,332 A * | 6/1991 | Stachler ...................... 206/232 |
| 5,348,216 A | 9/1994 | Scott ............................ 229/75 |
| 5,348,780 A | 9/1994 | Boggs et al. .................. 428/42 |
| 5,417,457 A * | 5/1995 | Reinhardt ..................... 283/81 |
| 5,647,482 A | 7/1997 | Kleinfelder ................. 206/308 |
| 5,662,217 A | 9/1997 | Durr ........................... 206/308 |
| 5,715,934 A | 2/1998 | Tobol et al. ................. 206/232 |
| 5,770,289 A * | 6/1998 | Tracy ......................... 428/40.1 |
| 5,776,571 A | 7/1998 | Michlin et al. ............... 428/40 |
| 5,789,051 A * | 8/1998 | Tracy ........................... 428/43 |
| 5,846,624 A * | 12/1998 | Denklau et al. .............. 428/43 |
| 5,909,805 A | 6/1999 | Neely ......................... 206/308 |
| 5,938,022 A | 8/1999 | Detloff ....................... 206/308 |
| 6,016,908 A | 1/2000 | Gaetano ..................... 206/308 |
| 6,155,026 A * | 12/2000 | Tracy ......................... 206/232 |
| 6,279,960 B1 * | 8/2001 | Claussnitzer ................. 283/81 |

FOREIGN PATENT DOCUMENTS

WO           98/20493    * 5/1998

* cited by examiner

Primary Examiner—Jim Foster
(74) Attorney, Agent, or Firm—Oppenheimer Wolff & Donnelly LLP

(57) ABSTRACT

Multi-layer sheet assemblies and methods for their use are disclosed, utilizing an indicia receivable label for media storage devices and associated inserts. These multi-layer sheet assemblies are provided with overall dimensions that facilitate easy feeding into and through printers, where desired indicia may be disposed onto the provided media storage label and associated insert. Software may be provided which contains templates to assist in the proper placement of indicia on the multi-layer sheet assemblies, including the label and the front and back of the insert. The assemblies provided may be configured for labeling various media storage devices, including CDs. A single multi-layer sheet assembly may include both a CD label and an insert for a CD jewel case, and both the label and insert may be printed all in one pass through a printer.

23 Claims, 2 Drawing Sheets

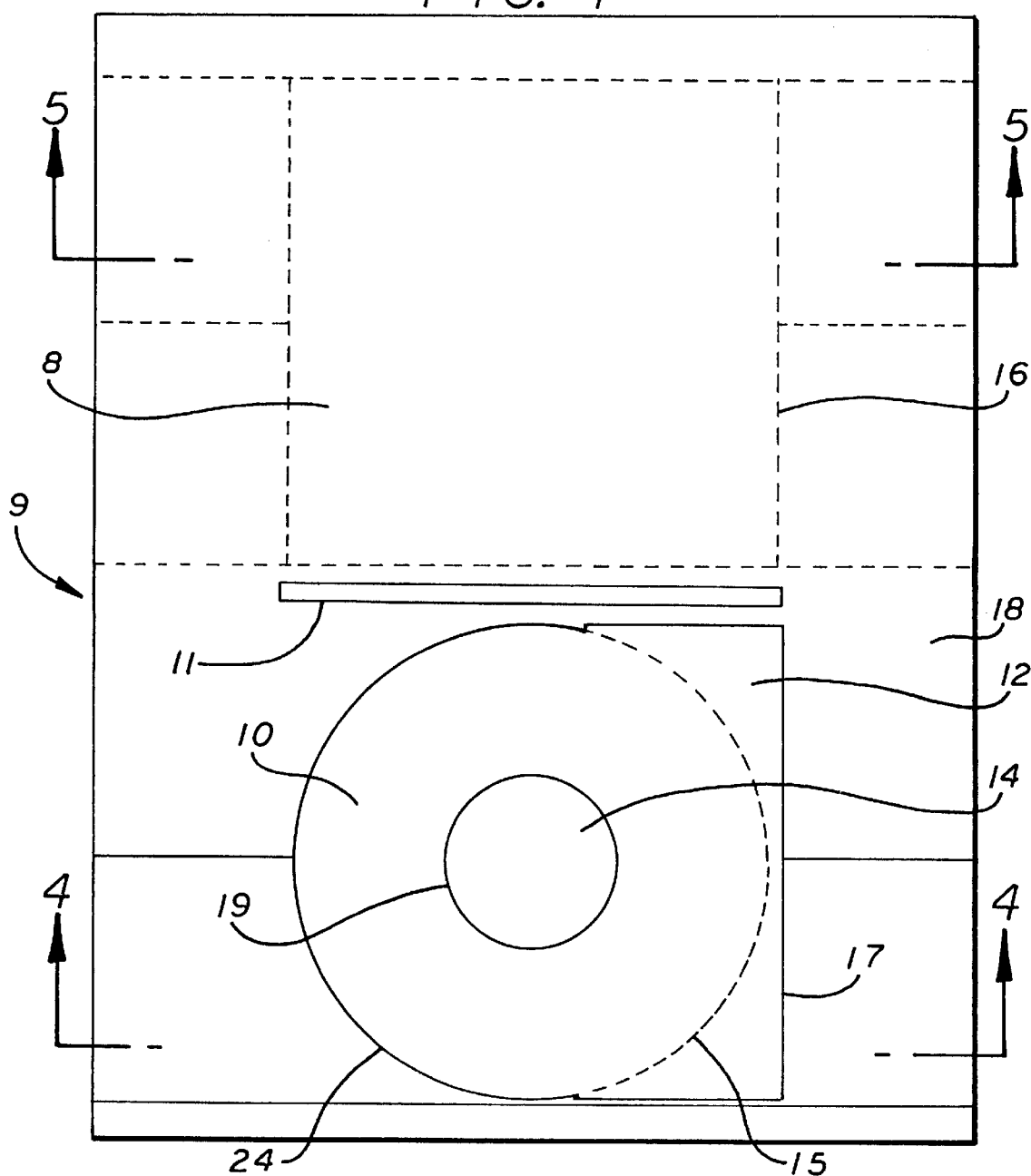

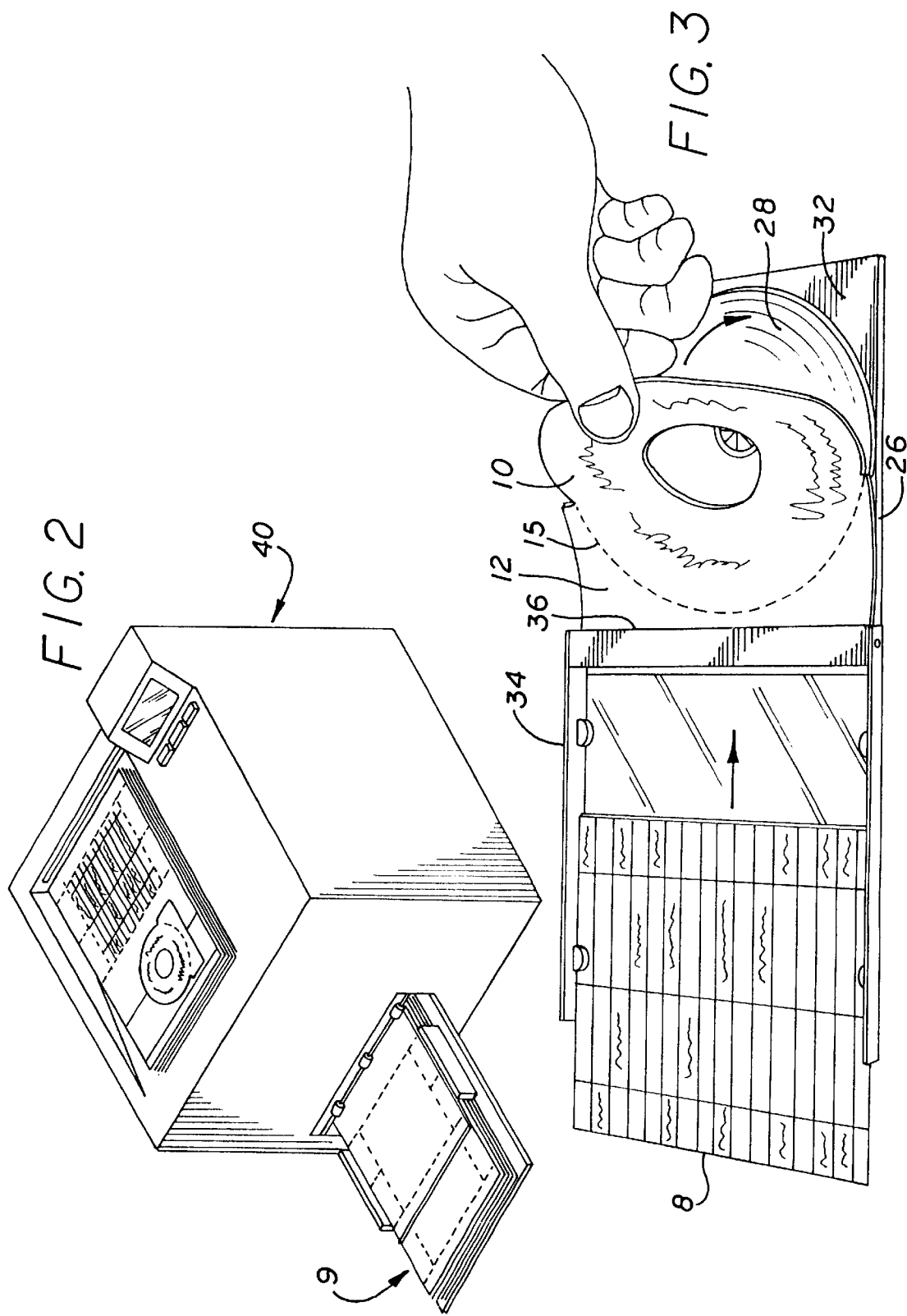

ALL IN ONE MULTI-LAYER LABEL AND INSERT ASSEMBLY

BACKGROUND OF THE INVENTION

Commensurate with the expansion of electronic innovations that are currently making their appearance in the consumer marketplace, is the availability of equipment that provides consumers with the ability to record various modalities of data, or media, that are associated with new as well as old technologies. Various methods of media storage, from the venerable video cassette recorders (VCRs) and audio cassette recorders and others, are utilized, ever more frequently, by consumers with various home recording devices to capture digital as well as analog data encoding computer programs, movies, music, video and pictures onto media storage devices.

One of the most recently introduced recording devices that has found widespread popularity are compact disc recorders and their associated recordable compact discs (CD-Rs). Compact disks (CDs) were first implemented commercially for storing digital audio data (CD-Digital Audio). The CD is made up of a polycarbonate substrate, a thin reflective metallic layer, and a lacquer coating. On one side of the CD is encoded a data track, comprising pits to encode data. This spiral track is about 1.6 to 2.2 microns wide, and the pits are about 0.6 microns wide. CDs commonly used for home recording are known in the common vernacular as CD-Rs, which stands for compact disc-recordable. In addition to these types of CDs, there are a plethora of additional types of CDs now available. These include CD-I, CD-ROM, CD-Text as well as other types of CDs, differing in their recording capabilities and the various formats in which data is stored onto the discs, as known in the art.

As the practice of recording various data on all manner of media storage devices (CDs, for example) becomes more and more commonplace, there arises an associated need for users to be able to recognize and identify individual media storage devices out of a plurality of media storage devices, as well as the data stored on them. Customarily users are provided with some sort of label or surface on the media storage device upon which indicia may be disposed.

For example, a "writeable" surface on the "backside" or non-electronically readable surface of the CD, is the common prior art method of identification by which individual CDs are distinguished from one another. This "backside" of the CDs may be provided with a coating upon which a user is able to apply various markings, as with a pen or felt tip marker, for example. Or, as another example, some CD-Rs are provided with blank, ring-shaped labels which can be marked by hand on one side and are secured onto the non-electronically readable surface of the CD by an adhesive. Such a type of label is exemplified in U.S. Pat. No. 5,715,934, wherein is provided an annular CD label with positioning means for placing the CD label "on center" on a CD.

While prior art methods for labeling various media storage devices typically rely on labels that are amenable to handwritten indicia, there is a current need for new more versatile media storage label assemblies. For example, the widespread use of computers and printers further argues the case for new, multi-layer sheet assemblies that provide media storage labels and inserts that may be used in conjunction with these printers.

Accordingly it is an object of the present invention to provide multi-layer sheet assemblies and associated methods of use to provide users of recordable media storage devices with a mode of producing media storage labels and associated inserts in an inclusive, all-in-one procedure.

It is further noted that layered assemblies and associated methods of the present invention are equally amenable to providing media storage labels and associated inserts for various sorts of media storage devices such as, but not limited to, various CD types, digital video discs (DVD)s, video tapes, and cassettes.

INVENTION SUMMARY

The present invention relates generally to methods and assemblies that are utilized for label printing. More particularly, the present invention relates to novel multi-layer sheet assemblies, upon which indicia may be deposited, including machine printable indicia.

In an exemplary embodiment of the present invention, multi-layer sheet assemblies, further detailed below, provide an adhesive CD label with an optional detachable positioning element, a spine label and an associated insert. The insert may receive, for example, a table of contents or other information or indicia that may relate or indicate the contents of the CD to which the associated media storage label will be affixed. In reference to this particular embodiment, the insert portion of the multi-layer assembly is detachable from the rest of the multi-layer sheet assembly and may be placed in the lid portion of the typical CD carrying case, commonly referred to as a "jewel case". Similarly, the spine label may be detached and placed on the "spine" portion of a jewel case.

Additionally, the present invention provides a multi-layer sheet assembly that may be fed into printers whereby an adhesive media storage label and optional detachable positioning elements and spine labels, as well as an associated insert, may be printed with desired indicia. The present invention disclosed and the associated methods of use are particularly well suited for utilization in printers that are commonplace in both the home and office. Deposition of desired indicia on both the adhesive media storage label and the associated insert, as well as spine labels, may be achieved all in one pass through the printer. If desired, users may deposit indicia on both sides of the insert by utilizing two passes in the printer. The multi-layer sheet assemblies are preferentially of constant thickness, for ease in printing, avoiding printer jams and uneven stacks of forms.

Other objects, features and advantages of the present invention will become apparent from a consideration of the following detailed description and the accompanying drawings.

BRIEF DESCRIPTION OF THE DRAWINGS

FIG. 1 is a top plan view of an exemplary multi-layer assembly illustrating the principles of the present invention.

FIG. 2 is a perspective view of a printer containing exemplary multi-layer sheet assemblies, depicting indicia disposed on the media storage label (here for a CD) and associated insert (shown here as a jewel case insert) after passing through the printer.

FIG. 3 is an exemplary depiction of the utilization of a media storage label and detachable positioning element as well as an associated insert, which are provided by the present invention.

FIG. 4 is a cross-sectional, end view taken along the plane 4—4 of FIG. 1.

FIG. 5 is a cross-sectional, end view taken along the plane 5—5 of FIG. 1.

DETAILED DESCRIPTION OF THE PREFERRED EMBODIMENTS

The multi-layer sheet assembly of the present invention is designed for use in conjunction with printing procedures that are typically utilized to dispose indicia on various forms of sheets. The exemplary multi-layer sheet assembly described herein is designed to provide, all in one sheet, a media storage label, spine label, a detachable positioning element and an insert. Such multi-layer sheet assemblies are provided so that they may be used to identify the multitude of media storage devices currently available such as, but not limited to, CDs, DVDs, minidiscs, video cassettes and audio cassettes, as well as others as known to those skilled in the art. In addition, the multi-layer sheet assembly of the present invention also provides users with labels that are easily centered onto various media storage devices.

Referring more particularly to the drawings, FIG. 1 illustrates an embodiment of the multi-layer sheet assembly of the present invention, generally indicated by reference 9, in its blank, pre-printed form. Multi-layer sheet assembly 9 is provided with a pre-cut insert 8 formed by perforations 16 that demarcate the overall size of insert 8. Provided perforations 16 allow users to easily separate insert 8 form the rest of multi-layer sheet assembly 9 by hand, for example.

In addition, multi-layer sheet assembly 9 is also provided with media storage label 10, spine label 11 and detachable positioning element 12. Similar to insert 8, media storage label 10, spine label 11 and detachable positioning element 12 are pre-cut into multi-layer sheet assembly 9. In this exemplary embodiment, media storage label 10, spine label 11 and detachable positioning element 12 are configured for use with CDs and their associated jewel cases. Still referring to FIG. 1, media storage label 10 is provided with label opening 14 that is formed by removing this portion of face stock layer 18 by cut 19, so as to be in register with and not cover the opening found in the middle of CDs. Separability of detachable positioning element 12 from media storage label 10 is achieved by pre-cut perforations 15 as detailed below. Both media storage label 10 and detachable positioning element 12 may be separable from multi-layer sheet assembly 9 by the die cuts 17 and 24 through the upper or face stock layer 18 of multi-layer sheet assembly 9. Optionally, perforations 25 in the liner layer 30 allow the liner layer 30 underneath detachable positioning element 12 to be separable from multi-layer sheet assembly 9 and remain in place on detachable positioning element 12, as diagramed in FIG. 4, described below.

FIG. 2 illustrates the printing of both the media storage labels 10 and inserts 8 on multi-layer sheet assemblies 9. A plurality of exemplary multi-layer sheet assemblies 9 are stacked into the feed tray of a printer 40. In the upper portion of printer 40, multi-layer sheet assemblies 9 emerge from printer 40 with desired indicia printed upon them. If desired, users may turn multi-layer sheet assemblies 9 over after a first pass and pass them through printer 40 again to deposit indicia on the reverse side of insert 8. In such an arrangement, a plurality of multi-layer sheet assemblies 9 may be supplied having identical indicia from one multi-layer sheet assembly 9 to the next. With indicia thus printed on media storage label 10, spine label 11 and insert 8, a user may label many copies of media storage devices and may also provide a plurality of identical inserts 8 and spine labels 11 for storage or carrying cases, such as jewel cases, for example. If desired, indicia disposed on media storage label 10 and insert 8 may vary, as specified by a user utilizing the appropriate computer software, from one multi-layer sheet assembly 9 to the next. In this way, a user may provide a unique media storage label 10 and insert 8 for media storage devices containing differing data and the associated storage cases, thus easily facilitating their identification at a later time.

FIG. 3 is a depiction of an exemplary method of use of the elements provided by the present invention. CD label and jewel case inserts exemplify media storage label 10 and insert 8, respectively. Illustrated in FIG. 3 is a method of utilizing media storage label 10 and insert 8 provided by multi-layer sheet assembly 9. In FIG. 3, insert 8, with indicia now disposed on one or both sides, has been separated from the rest of multi-layer sheet assembly 9 by tearing along provided perforations 16 cut or pressed into multi-layer sheet assembly 9. Once free of multi-layer sheet assembly 9, insert 8 may be placed in a convenient location. For example, as depicted in FIG. 3, insert 8, now having imprinted upon it indicia, may be configured to fit into the lid portion 34 of a CD jewel case. Additionally, insert 8 may be placed in the back portion of a jewel case.

In order to utilize media storage label 10 provided by multi-layer sheet assembly 9, users separate media storage label 10 from multi-layer sheet assembly 9 by grasping detachable positioning element 12. Detachable positioning element 12 is made easily accessible by a number of methods. Exemplary methods include constructing multi-layer sheet assembly 9 so that the area between face stock layer 18 and liner layer 30 may be void of any adhesive 20, as detailed below. As one skilled in the art would appreciate, another exemplary method of providing accessibility of detachable positioning element 12 is to "deaden" adhesive 20 that may be disposed underneath detachable positioning element 12. The "deadening" may be provided, for example, by disposing a varnish between liner layer 30 and adhesive 20 disposed underneath detachable positioning element 12. Grasping and removing the detachable positioning element 12 portion of face stock layer 18 also removes media storage label 10 from multi-layer sheet assembly 9.

The CD to be labeled is placed in the jewel case 32 and, by utilizing detachable positioning element 12, media storage label 10 is centered onto the non-electronically readable surface of the CD and adheres to the CD by adhesive 20. Detachable positioning element 12 is used to center attached media storage label 10 onto a CD, for example, by adjusting the position of detachable positioning element 12, by hand for example, so that the edges of detachable positioning element 12 contact and line up exactly with edges 26 and 36 of the CD bearing portion of the jewel case. When thus aligned, detachable positioning element 12 places the media storage label 10 in exact register with CD 28 in the jewel case. The user then applies pressure by hand, for example, to the now centered media storage label 10 which adheres to the non-electronically readable portion of CD 28. This adhesion is provided by adhesive 20 located on the non-indicia receiving side of media storage label 10, which contacts the non-electronically readable side of the CD. Adhesive 20 can be, for example, a rubber based hot melt adhesive, acrylic emulsions or any pressure sensitive adhesive, as known in the art. Preferably, a permanent pressure sensitive adhesive is employed.

As shown in FIG. 4, which is an exemplary cross-sectional view of multi-layer sheet assembly 9 through plane 4—4 of FIG. 1, a multi-layer assembly can be comprised of layers of differing materials, arranged in various configurations. In the example of FIG. 4, the first, or top layer, comprises a face stock layer 18. This layer may be comprised of paper, such as, but not limited to, xerographic grade paper known to those skilled in the art as "24 lb paper". Face stock layer 18 may have a thickness of about 4 mils or 0.004 inch. The bottom layer, or liner layer 30, can also be comprised of paper, such as 80 lb offset paper. The thickness of liner layer 30 may be about 5 mils. Between face stock layer 18 and liner layer 30 is an adhesive layer 20, which can be a pressure sensitive adhesive. The adhesive layer 20 disposed between face stock layer 18 and liner layer 30 may be about 1 mil thick. The total thickness of multi-layer assembly is preferably about 5 to 10 mils thick, in order to be able to be fed reliably into various, currently available printers.

As an example, as seen in FIG. 4, adhesive layer 20 is not disposed evenly throughout the area lying between face stock layer 18 and liner layer 30. Area 22 is an area directly beneath detachable positioning element 12 and is devoid of adhesive 20. This affords users an easily accessible portion of face stock layer 18, as provided by cut 17, to form detachable positioning element 12. This facilitates separation of media storage label 10 and detachable positioning element 12 from multi-layer sheet assembly 9. Media storage label 10 is provided with releasability from liner layer 30 by a coating of a release layer (not shown), such as silicone, between adhesive layer 20 and liner layer 30 in the portion of multi-layer sheet assembly 9 defined by media storage label 10. Thus, media storage label 10 is provided with adhesive 20 on its bottom portion that will be utilized to affix media storage label 10 to a media storage device, here exemplified by a CD.

As illustrated in FIG. 4, detachable positioning element 12 is rendered separable from multi-layer sheet assembly 9 by cuts in face stock layer 18. Exemplary cuts are provided to form media storage label 10 and detachable positioning element 12 and include perimeter cuts 24 and 17, as well as annular cut 19 as seen in FIG. 1. Perimeter cuts may be deep enough to extend through face stock layer 18 and adhesive layer 20, as seen in the cross-section of FIG. 4. Separability of detachable positioning element 12 from media storage label 10 is provided by perforations 15 at the juncture of these elements. Once media-storage label 10 is centered and adheres to a CD by utilizing detachable positioning element 12, detachable positioning element 12 can be separated from the affixed media storage label 10.

It is further contemplated that the area underneath detachable positioning element 12 may have adhesive 20 disposed underneath, as mentioned previously. Perforations 25, or other cuts, may be provided in liner layer 30. In this exemplary embodiment, when media storage label 10 and detachable positioning element 12 are separated from multi-layer sheet assembly 9, media storage label 10 will have adhesive 20 underneath it exposed whereas detachable positioning element 12 will have its underlying, associated portion of liner layer 30 still attached, providing a non-sticky, detachable portion with which to handle and position media storage label 10.

Another cross-sectional view of exemplary multi-layer sheet assembly 9 depicted in FIG. 1 is provided by FIG. 5. In FIG. 5 the cross-section is of the plane along line 5—5 of FIG. 1. This cross-section shows a portion of multi-layer sheet assembly 9 comprising insert 8. As shown in this figure, the adhesive layer 20 is disposed between face stock layer 18 and liner layer 30, with no area void of adhesive 20. It is also noted that in this exemplary embodiment, no release coating is provided.

It is noted that in other contemplated embodiments, a release coating may be disposed between face stock layer 18 and liner layer 30 comprising insert 8. Thus constructed, multi-layer sheet assembly 9 may provide insert 8 with adhesivness that may be employed to place and adhere insert 8 to the outside of a CD jewel case, for example.

Returning to FIG. 5, exemplary multi-layer sheet assembly 9 provides a double layer thickness insert 8. It should also be noted that the liner in this area is printable and may have indicia disposed upon it, if so desired. Insert 8 can be completely separable from the other portions of multi-layer assembly 8 by perforations 16. Perforations 16, as well as other perforations and cuts, may by die cut into or through all layers comprising multi-layer sheet assembly 9. By providing perforations 16 in multi-layer sheet assembly 9 of the present invention, insert 8 is rendered easily separable from the totality of multi-layer sheet assembly 9. Insert 8 may have peripheral die cuts extending completely through upper face stock layer 18 and perforations through liner layer 30 to facilitate separation from multi-layer sheet assembly 9.

Overall dimensions of multi-layer sheet assembly 9 provide ease with which to feed such assemblies into printers such as, but not limited to, dot matrix, ink jet, laser, die sublimation and other printers, as known to those skilled in the art. Multi-layer sheet assembly 9 may be standard 8.5×11 inch or A4 size sheets, or may be of similar size to legal size paper, by way of examples but not of limitation.

In closing it is to be understood that the embodiments of the invention disclosed herein are illustrative of the principles of the invention. Other modifications may be employed which are within the scope of the invention; thus, by way of example but not of limitation, alternative multi-layer configurations may be assembled to form multi-layer sheet assemblies 9 other than those configurations generally shown herein. Alternative thicknesses and materials of various layers comprising disclosed multi-layer sheet assembly 9 are considered to be within the scope of the present invention. Similarly, various alternative cuts into multi-layer sheet assemblies 9 can provide labels for cassettes, VHS tapes and other media storage devices. It is further noted that insert 8 is preferably about 4.75 inches square to fit inside a CD jewel case, and that the CD label has a diameter of about 4.5 inches; however for other storage devices, other shapes and dimensions may be employed. It is also noted that in case the insert 8 is to be adhered to a container, a releasable coating could be applied to the underlying area of the liner to permit removal of adhesive coated face stock in the area of the insert. Accordingly, the present invention is not limited to that precisely as shown and described in the present specification.

What is claimed is:

1. A multi-layer sheet assembly for forming a CD label and jewel case insert comprising:
    a multi-layer sheet, comprising an upper face stock sheet and a lower liner sheet;
    a layer of adhesive between said two sheets;
    said face stock sheet being die cut in a first area to form a round CD label, and being die cut in a second area to form a rectangular jewel case insert;
    said liner sheet being coated with a release layer in said first area to permit easy removal of said CD label and not in said second area; and
    said upper and lower sheets being substantially permanently secured together in said second area to form a double thickness jewel case insert.

2. The multi-layer sheet assembly as defined in claim 1, wherein said CD label has a detachable positioning element formed in said face stock and secured to said CD label by perforations.

3. The multi-layer sheet assembly as defined in claim 1, wherein said multi-layer sheet assembly is of uniform thickness, and is approximately 8.5×11 inches or A-4 sheet size, and is not more than 12 mils thick;

whereby said multi-layer sheet assembly is readily fed through and printed upon in laser or inkjet printers without jamming.

4. The multi-layer sheet assembly of claim 1, wherein said multi-layer sheet assembly is approximately 8.5×11 inches or A-4 sheet size, for ready feeding through a printer without jamming.

5. The multi-layer sheet assembly of claim 2, wherein said label has a central opening and said detachable positioning element is configured to align said central opening with an opening of a compact disc.

6. The multi-layer sheet assembly of claim 1, wherein said insert provides an area wherein indicia is associated with data stored on a compact disk, said compact disk being labeled by said media storage label.

7. The multi-layer sheet assembly of claim 1, wherein said insert provides an area upon which indicia may be disposed on both sides of said insert.

8. The multi-layer sheet assembly of claim 1, wherein said insert is configured to provide a jewel case insert, and is approximately 4.75 inches square.

9. The multi-layer sheet assembly of claim 1, wherein said multi-layer sheet assembly is of sufficient size to feed into and provide one pass printing in a printer, whereby indicia may be applied concurrently to both said CD label and said insert so as to provide an efficacious manner with which to print said labels and said associated inserts.

10. The multi-layer sheet assembly of claim 1, wherein said multi-layer sheet assembly may be passed through a printer twice in order to deposit indicia on both sides of said insert.

11. The multi-layer sheet assembly of claim 1, wherein said CD label has positioning elements formed in said face stock and secured to the CD label by perforations, said positioning elements being free of adhesive.

12. The multi-layer sheet assembly of claim 1, wherein said layer of adhesive is comprised of a rubber based hot melt adhesive.

13. The layer of adhesive of claim 1, wherein said layer of adhesive is a permanent pressure sensitive adhesive.

14. The multi-layer sheet assembly of claim 1, wherein said multi-layer sheet assembly is between 5 to 10 mils thick.

15. The multi-layer sheet assembly of claim 1, further comprising said face stock sheet being die cut in a third area to form a jewel case spine label.

16. A multi-layer sheet assembly for forming a CD label and jewel case insert for a jewel case lid having a predetermined length and width comprising:

a multi-layer sheet, comprising an upper face stock sheet and a lower liner sheet;

a layer of adhesive between said face stock and lower liner sheets;

said face stock sheet being die cut in a first area to form a CD label, having a diameter substantially equal to said predetermined width, and being die cut in a second area to form a rectangular jewel case insert having a length and width which are substantially equal to said predetermined length and width; and said liner sheet being coated with a release layer in said first area to permit easy removal of said CD label.

17. The multi-layer sheet assembly as defined in claim 16, wherein said CD label has a detachable positioning element formed in said face stock and secured to said CD label by perforations.

18. The multi-layer sheet assembly as defined in claim 16, wherein said multi-layer sheet assembly is of uniform thickness, and is approximately 8.5×11 inches or A-4 sheet size, and is not more than 12 mils thick;

whereby said multi-layer sheet assembly is readily fed through and printed upon in laser or inkjet printers without jamming.

19. The multi-layer sheet assembly of claim 16, wherein said multi-layer sheet assembly is approximately 8.5×11 inches or A-4 sheet size, for ready feeding through a printer without jamming.

20. The multi-layer sheet assembly of claim 16, wherein said label has a central opening and said detachable positioning element is configured to align said central opening with an opening of a compact disc.

21. The multi-layer sheet assembly of claim 16, wherein said insert is configured to provide a jewel case insert, and is approximately 4.75 inches square.

22. The multi-layer sheet assembly of claim 16, wherein said multi-layer sheet assembly is of sufficient size to feed into and provide one pass printing in a printer, whereby indicia may be applied concurrently to both said CD label and said insert so as to provide an efficacious manner with which to print said labels and said associated inserts.

23. The multi-layer sheet assembly of claim 16, further comprising said face stock sheet being die cut in a third area to form a jewel case spine label.

* * * * *